US011939209B2

(12) United States Patent
DiRocco, Jr.

(10) Patent No.: US 11,939,209 B2
(45) Date of Patent: Mar. 26, 2024

(54) METERING PUMPS FOR FUELING APPLICATIONS

(71) Applicant: Wayne Fueling Systems LLC, Austin, TX (US)

(72) Inventor: James David DiRocco, Jr., Hutto, TX (US)

(73) Assignee: Wayne Fueling Systems LLC, Austin, TX (US)

( * ) Notice: Subject to any disclaimer, the term of this patent is extended or adjusted under 35 U.S.C. 154(b) by 934 days.

(21) Appl. No.: 16/899,270

(22) Filed: Jun. 11, 2020

(65) Prior Publication Data

US 2021/0387848 A1 Dec. 16, 2021

(51) Int. Cl.

| | |
|---|---|
| ***B67D 7/74*** | (2010.01) |
| ***B67D 7/04*** | (2010.01) |
| ***B67D 7/64*** | (2010.01) |
| ***F04B 49/12*** | (2006.01) |
| ***F04B 49/24*** | (2006.01) |

(52) U.S. Cl.

CPC ............... *B67D 7/744* (2013.01); *B67D 7/04* (2013.01); *B67D 7/64* (2013.01); *F04B 49/12* (2013.01); *F04B 49/24* (2013.01)

(58) Field of Classification Search

CPC .. B67D 7/744; B67D 7/64; B67D 7/04; F04B 49/12; F04B 49/24

USPC .................. 222/71, 14, 16, 57, 54, 639, 642

See application file for complete search history.

(56) References Cited

U.S. PATENT DOCUMENTS 2,638,247 A * 5/1953 Taylor .................... B67D 7/741 222/23
4,131,215 A 12/1978 Hansel
8,465,268 B2 * 6/2013 Baxter .................... E21B 43/25 417/454

(Continued)

FOREIGN PATENT DOCUMENTS

DE 102008002195 12/2009
EP 0638355 2/1995

(Continued)

OTHER PUBLICATIONS

PCT International Search Report and Written Opinion in International Appln. No. PCT/US2021/036174, dated Aug. 5, 2021, 17 pages.

(Continued)

*Primary Examiner* — Lien M Ngo
(74) *Attorney, Agent, or Firm* — Fish & Richardson P.C.

(57) ABSTRACT

A metering pump for dispensing a fuel additive includes a pump body, an inlet and an outlet at which fuel additive respectively enters and exits the metering pump, a piston contained within a piston bore and being configured to draw fuel additive into the metering pump through the inlet and to dispense fuel additive from the metering pump through the outlet, an inflow valve configured to permit fuel additive to flow in a single direction away from the inlet and to prevent fuel additive from flowing in an opposite direction back into the inlet, and an outflow valve configured to permit fuel additive to flow in the single direction towards the outlet, wherein the metering pump has a configuration in which the inlet, the outlet, the piston, the piston bore, the inflow valve, and the outflow valve are centrally positioned along a central plane of the pump body.

18 Claims, 11 Drawing Sheets

(56) References Cited

U.S. PATENT DOCUMENTS

| | | | | |
|---|---|---|---|---|
| 9,188,123 | B2 * | 11/2015 | Hubenschmidt | F04B 53/007 |
| 10,563,494 | B2 * | 2/2020 | Graham | B23P 6/04 |
| 2014/0255219 | A1 | 9/2014 | Lucas | |
| 2017/0204850 | A1 * | 7/2017 | Graham | F04B 49/24 |
| 2020/0309076 | A1 * | 10/2020 | Kazour | F02M 59/445 |
| 2021/0040945 | A1 * | 2/2021 | Hurst | F04B 49/08 |

FOREIGN PATENT DOCUMENTS

| | | |
|---|---|---|
| EP | 0942894 | 9/1999 |
| EP | 1196857 | 4/2002 |
| EP | 3064280 | 9/2016 |
| EP | 3365268 | 8/2018 |
| FR | 2646937 | 11/1990 |
| FR | 2677634 | 12/1992 |
| FR | 2867177 | 9/2005 |
| GB | 755630 | 8/1956 |
| GB | 920783 | 3/1963 |
| GB | 1080672 | 8/1967 |
| WO | WO 1992/00455 | 1/1992 |
| WO | WO 02069066 | 9/2002 |
| WO | WO 2008/090137 | 7/2008 |
| WO | WO 2017068545 | 4/2017 |

OTHER PUBLICATIONS

PCT International Preliminary Report on Patentability in International Appln. No. PCT/US2021/036174, dated Dec. 13, 2022, 10 pages.

* cited by examiner

186

METERING PUMPS FOR FUELING APPLICATIONS

TECHNICAL FIELD

This disclosure relates to metering pumps for fueling applications, such as compact additive pumps for injecting additives into fuels at fuel dispensers.

BACKGROUND

Fuel dispensers at service stations typically offer multiple fuels that can be selected to fuel a variety of vehicles, as well as fuel additives that can be optionally injected into a selected fuel to improve a vehicle's performance. Equipment within the fuel dispenser for providing the fuel additives typically includes additive tanks that store fuel additives and additive pumps for injecting the fuel additives into a selected fuel. Due to large sizes and cumbersome, expensive configurations of additive pumps, fuel dispensers typically have limited locations at which an additive pump can be installed and often require large, unaesthetic components for covering an additive pump.

SUMMARY

This disclosure relates to metering pumps for fueling applications, such as compact additive pumps for injecting additives into fuels at fuel dispensers.

In one aspect, a metering pump for dispensing a fuel additive includes a pump body, an inlet at which the fuel additive enters the metering pump and an outlet at which the fuel additive exits the metering pump, the inlet and the outlet being coupled to the pump body, a piston bore within the pump body, a piston contained within the piston bore, the piston being configured to draw the fuel additive into the metering pump through the inlet and to dispense the fuel additive from the metering pump through the outlet, an inflow valve coupled to the pump body and configured to permit the fuel additive to flow in a single direction away from the inlet and to prevent the fuel additive from flowing in an opposite direction back into the inlet, and an outflow valve coupled to the pump body and configured to permit the fuel additive to flow in the single direction towards the outlet, wherein the metering pump has a configuration in which the inlet, the outlet, the piston, the piston bore, the inflow valve, and the outflow valve are centrally positioned along a central plane of the pump body.

Embodiments may provide one or more of the following features.

In some embodiments, the configuration provides the metering pump with a substantially flat shape.

In some embodiments, metering pump further includes an actuation system coupled to the pump body and to the piston, the actuation system being configured to move the piston in a first direction to draw the fuel additive into the piston bore and to move the piston in a second direction to eject the fuel additive from the piston bore, the second direction being opposite to the first direction.

In some embodiments, the inlet and the outlet are aligned in an axial arrangement, and the inflow valve and the outflow valve are axially aligned with the inlet and the outlet along the axial arrangement.

In some embodiments, the piston bore is defined by the pump body and is oriented parallel to the axial arrangement.

In some embodiments, the piston bore is disposed along a first side of the pump body, and the metering pump further includes a pressure relief system disposed along a second side of the pump body, the second side being opposite from the first side, and the pressure relief system being centrally positioned along the central plane of the pump body.

In some embodiments, the pressure relief system includes a pressure relief valve and a bypass channel defined by the pump body, wherein the bypass channel includes a main portion that contains the pressure relief valve, and the pressure relief valve and the main portion are oriented parallel to the axial arrangement.

In some embodiments, a first end of the bypass channel is located downstream of the outflow valve and a second end of the bypass channel is located upstream of the inflow valve, wherein the pressure relief valve is configured to permit through-flow of the fuel additive along the bypass channel and back to the inlet once a fluid pressure of the fuel additive reaches a threshold pressure.

In some embodiments, the pump body defines an inflow channel that extends from the inlet through a position of the inflow valve, a channel hub that extends between the inflow and outflow valves, and an outflow channel that extends from the channel hub to the outlet and that therefore contains the outflow valve, wherein the inflow channel, the channel hub, and the outflow channel are axially aligned with the axial arrangement.

In some embodiments, the pump body defines an actuation channel that extends from the channel hub towards the piston bore, wherein the actuation channel, the inflow channel, the channel hub, the outflow channel and the bypass channel are centrally positioned along the central plane of the pump body.

In some embodiments, the actuation channel, the inflow channel, the channel hub, the outflow channel, the bypass channel, and the piston bore are integrally formed with the pump body.

In some embodiments, the metering pump further includes a magnetically activated flow sensor that is configured to detect a flow of a volume of the fuel additive towards the outlet and a magnet disposed within an outflow channel of the body and configured to be moved axially by the flow of the volume of the fuel additive, wherein the magnet is axially aligned with the inlet and the outlet along the axial arrangement.

In some embodiments, the pump body defines one or more lateral protrusions at which the metering pump is alignable laterally with another metering pump.

In some embodiments, the pump body defines an opening sized to receive a fastener for securing the metering pump to a mounting fixture.

In some embodiments, the metering pump has a total thickness that falls in a range of about 4 cm to about 5 cm.

In another aspect, a fuel dispensing system includes a fuel line configured for carrying a fuel to be dispensed from the fuel dispensing system, a storage tank containing a fuel additive to be injected into the fuel, a metering pump coupled to the storage tank and configured to inject the fuel additive into the fuel, and a control module configured to control operation of the metering pump. The metering pump includes an inlet at which the fuel additive enters the metering pump and an outlet at which the fuel additive exits the metering pump, the inlet and the outlet being coupled to the pump body, a piston bore within the pump body, a piston contained within the piston bore, the piston being configured to draw the fuel additive into the metering pump through the inlet and to dispense the fuel additive from the metering pump through the outlet, an inflow valve coupled to the pump body and configured to permit the fuel additive to flow in a single direction away from the inlet and to prevent the fuel additive from flowing in an opposite direction back into the inlet, and an outflow valve coupled to the pump body and configured to permit the fuel additive to flow in the single direction towards the outlet, wherein the metering pump has a configuration in which the inlet, the outlet, the piston, the piston bore, the inflow valve, and the outflow valve are centrally positioned along a central plane of the pump body.

Embodiments may provide one or more of the following features.

In some embodiments, the fuel dispensing system further includes a housing that supports or contains each of the fuel line, the storage tank, the metering pump, and the control module.

In some embodiments, the metering pump is installed to a columnar member of the housing.

In some embodiments, the fuel dispensing system further includes an assembly of multiple metering pumps arranged in a laterally stacked configuration.

In some embodiments, the control module is configured to control an axial stroke length of the piston.

The details of one or more embodiments are set forth in the accompanying drawings and description. Other features, aspects, and advantages of the embodiments will become apparent from the description, drawings, and claims.

DETAILED DESCRIPTION

Figure 1:
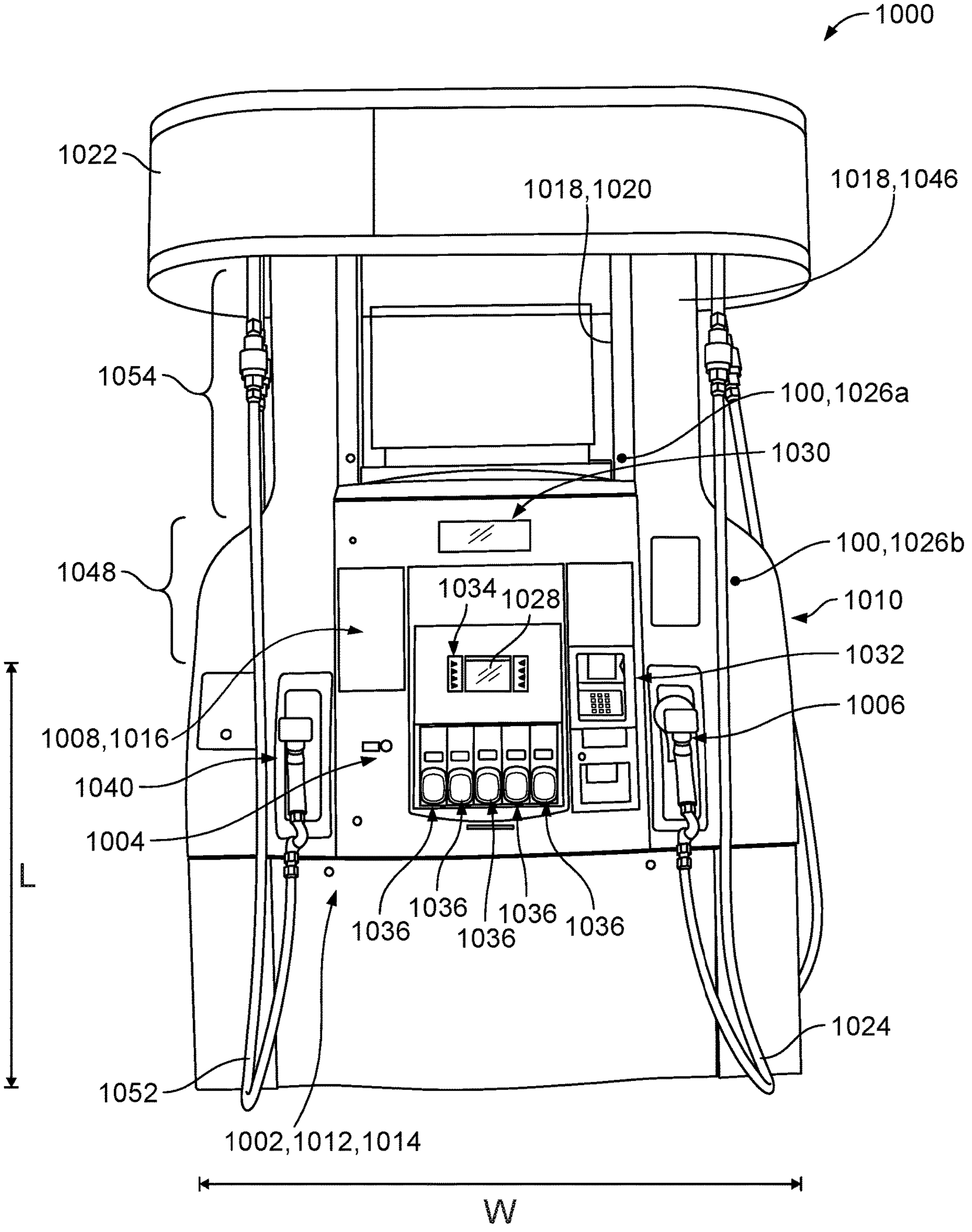
FIG. 1 is a perspective view of fuel dispensing system.

FIG. 1 illustrates an example fuel dispensing system 1000 from which multiple fuels can be selectively dispensed to a fluid receptacle (e.g., a vehicle fuel tank or a hand-held fuel tank). The fuel dispensing system 1000 is designed to be compliant with industry standards for explosive environments, such as Underwriters Laboratories (UL) requirements in the U.S. or the Atmosphere Explosive (ATEX) directive in Europe. The fuel dispensing system 1000 includes multiple internal fuel lines 1002 respectively containing multiple fuels that are selectable for dispense, front and rear user interface modules 1004 providing means for communicating with the fuel dispensing system 1000, front and rear hand-held pump nozzles 1006, 1040 for respectively dispensing a selected fuel through dispensing lines 1024, 1052, a control module 1008 that controls operation of the fuel dispensing system 1000, and a housing 1010 that contains or otherwise supports the various components of the fuel dispensing system 1000. The multiple fuels provided at the fuel dispensing system 1000 may vary by one or more parameters, such as an octane rating, a fuel type (e.g., gasoline or diesel fuel), a percent purity, amounts of additives (e.g., ethanol for gasoline or bio-diesel and dye for diesel fuel), a seasonal aspect (e.g., summer fuels or winter fuels), and proprietary fuel blends that may vary from supplier to supplier.

In addition to providing multiple selectable fuels, the fuel dispensing system 1000 also provides one or more fuel additives that can be selectively injected into a selected fuel while the fuel is dispensed. Accordingly, the fuel dispensing system 1000 further includes one or more storage tanks 1012 respectively containing the one or more additives and one or more metering pumps 100 associated with the one or more storage tanks 1012 for selectively injecting an additive into the selected fuel. The additives may provide one or more functions, such as improving motor performance, protecting a motor against friction (e.g., increasing motor life), reducing fuel consumption, and cleaning a motor. In some embodiments, along each side of the fuel dispensing system 1000, one of the pump nozzles 1006, 1040 and the associated dispensing line 1024, 1052 may be dedicated to dispensing gasoline, and the other of the pump nozzles 1006, 1040 and the associated dispensing line 1024, 1052 may be dedicated to dispensing diesel fuel. Example gasoline additives provided for optional selection at the fuel dispensing system 1000 include octane boosters and detergents for engine cleaning. Example diesel fuel additives provided for optional selection include cetane boosters and additives for reducing emissions and boosting lubricity. The additives may vary by one or more parameters, such as concentration, viscosity, and chemical composition, among many other parameters.

The housing 1010 includes a lower frame 1014 that contains the fuel lines 1002 and the storage tanks 1012 and supports the pump nozzles 1006, 1040, a central electronics cabinet 1016 that houses the control module 1008 and supports the user interface modules 1004, columns 1018 that extends upward from the lower frame 1014, and an upper frame 1022 that extends across the columns 1018. Each column 1018 includes an inner column cover 1020 that is surrounded by an outer column cover 1046. The outer column cover 1046 includes an upper portion 1054 that extends upward to the upper frame 1022 and a base 1048 that extends to the lower frame 1014.

The lower frame 1014 has a width (W) that typically falls in a range of about 1.5 meters (m) to about 0.9 m, a maximum depth (e.g., at a ground surface) that typically falls in a range of about 0.5 m to about 0.6 m, and a vertical length (L) (e.g., a height terminating at the bases 1048 of the columns 1018) that typically falls in a range of about 0.5 m to about 1.3 m. The column 1018 typically has a depth (e.g., also defining a minimum depth of the lower frame 1014) that falls in a range of about 15 centimeters (cm) to about 30 cm. The upper portion 1054 of each column 1018 typically has a width that falls in range of about 20 cm to about 30 cm and a vertical length that falls in range of about 118 cm to about 105 cm. The base 1048 of each column 1018 typically has a width that falls in range of about 50 cm to about 60 cm and a vertical length that falls in range of about 63 cm to about 98 cm.

One or more metering pumps 100 may be installed at a variety of locations within the housing 1010, such as at locations 1026*a* and 1026*b*, as will be discussed in more detail below. Each user interface module 1004 includes display screens 1028, 1030, an entry pad 1032 (e.g., a keyboard), selectors 1034 (e.g., buttons) for inputting information, and selectors 1036 (e.g., buttons) for selecting a fuel of the multiple fuels to be dispensed. Along each side of the fuel dispensing system 1000, an additive may be optionally selected for injection into a selected fuel at one or more of the entry pad 1032, the selectors 1034, and the selectors 1036.

FIGS. 2-5 illustrate an example metering pump 100 of the fuel dispensing system 1000 for injecting an additive into a selected fuel. The metering pump 100 is a proportional metering pump with a compact size that advantageously enables installation of the metering pump 100 at the multiple locations 1026 within the fuel dispensing system 1000, including within spaces of very restricted size, such as the space at the location 1026*a* within an inner column cover 1020 or the space at the location 1026*b* within a base 1048 of an outer column cover 1046. The metering pump 100 includes a body 102 that is equipped with several components. For example, the metering pump 100 further includes an inlet 104 at which an additive enters the metering pump 100, a piston 106 that draws (e.g., suctions) the additive into the metering pump 100, and an inflow valve 108 (e.g., a check valve) that permits flow of the additive in only one direction 188 through the inflow valve 108 from the inlet 104 to the piston 106. The inlet 104 is coupled to an additive supply line 1042 that delivers the additive from an additive storage tank 1012.

The metering pump 100 further includes a bushing 110 (e.g., an oil impregnated bronze bushing) that secures the piston 106 to the body 102 and an actuation system 112 that controls axial movement of the piston 106. The actuation system 112 includes a stepper motor 114 equipped with an encoder 116 and a linear actuator 118 for precisely controlling an axial stroke of the piston 106 to provide highly accurate metering of a dispense volume of the additive. The piston 106 includes a shaft 148 and a sealing device 158 that seals against a piston bore 138 of the body 102. The sealing device 158 includes a body 150 with a high polish finish and sealing elements 164 (e.g., o-ring seals) carried on the body 150.

The metering pump 100 also includes an outlet 120 at which the additive exits the metering pump 100 and an outflow valve 122 (e.g., a check valve) that permits flow of the additive in only the one direction 188 through the outflow valve 122 from the piston 106 to the outlet 120. The outlet 120 is coupled to an additive injection line 1044 that delivers the additive to an interior portion of a dispensing line 1024, 1052 for injection into the selected fuel as the fuel is dispensed to the pump nozzle 1006. The metering pump 100 further includes a pressure relief valve 124 that directs the additive back to the inlet 104 through a bypass channel 144 if the outlet 120 is closed or otherwise blocked off. The pressure relief valve 124 therefore functions as a safety mechanism that prevents a fluid pressure of the additive within the metering pump 100 from exceeding a threshold pressure rating of the metering pump 100. In some embodiments, the metering pump 100 has a threshold pressure rating of up to about 345 kilopascals (kPa). The pressure relief valve 124 and the bypass channel 144 together form a pressure relief system that complies with industry standards for fluid outlet pressure ratings, such as UL requirements.

The metering pump 100 also includes a magnet 126 within a flow stream of the additive that acts as a piston and moves axially in the direction 188 when the additive is dispensed through the outlet 120. In association with the magnet 126, the metering pump 100 further includes a plunger 146 that supports the magnet 126, a spring 128 that limits a rate of travel of the plunger 146 and the magnet 126, and a flow sensor 130 (e.g., a magnetic reed switch) that is activated by a magnetic field generated by the magnet 126 upon movement of the magnet 126. The flow sensor 130 transmits a signal to the control module 1008 indicating a dispense of the additive each time the additive is dispensed through the outlet 120 of the metering pump 100. The flow sensor 130 offers a relatively low-cost flow detection mechanism as compared to more expensive flow meters that are utilized in conventional additive pumps.

In addition to being equipped with several components, the body 102 integrally defines several fluid pathways within the metering pump 100. For example, the body 102 defines an inflow channel 132 that extends from the inlet 104 through a position of the inflow valve 108, a channel hub 134 that extends between the inflow and outflow valves 108, 122, an actuation channel 136 that extends from the channel hub 134 towards the piston 106, and the piston bore 138 in which the piston 106 is disposed for axial movement. The body 102 further defines a receptacle 142 that supports the flow sensor 130 and an outflow channel 140 that extends from the channel hub 134 to the outlet 120 and that therefore contains the outflow valve 122, the magnet 126, the plunger 146, and the spring 128. The body 102 also defines the bypass channel 144, which contains the pressure relief valve 124. The bypass channel 144 extends between the outflow channel 140 at a location downstream of the outflow valve 122 and the inflow channel 132 at a location upstream of the inflow valve 108.

The inflow and outflow valves 108, 122 together function as pair of valves that restrict a direction of the flow of the additive to the single vertical, bulk direction 188 through one of the valves 108, 122 at any given time within the metering pump 100. When the piston 106 moves upward in the direction 188 within the piston bore 138 to pull the additive into the metering pump 100, the additive flows through the inflow valve 108 and the actuation channel 136 into the piston bore 138. Owing to the suction force applied within the piston bore 138, the additive flows from the channel hub 134 into the actuation channel 136, as opposed to flowing further upward into the outflow valve 122. Conversely, when the piston moves downward in an opposite direction 190 within the piston bore 138 to eject the additive out of the piston bore 138, the outflow valve 122 permits the additive to flow through the outflow channel 140 towards the outlet 120, while the inflow valve 108 prevents the additive from flowing in the direction 190 back through the inflow channel 132 towards the inlet 104.

Figure 2:
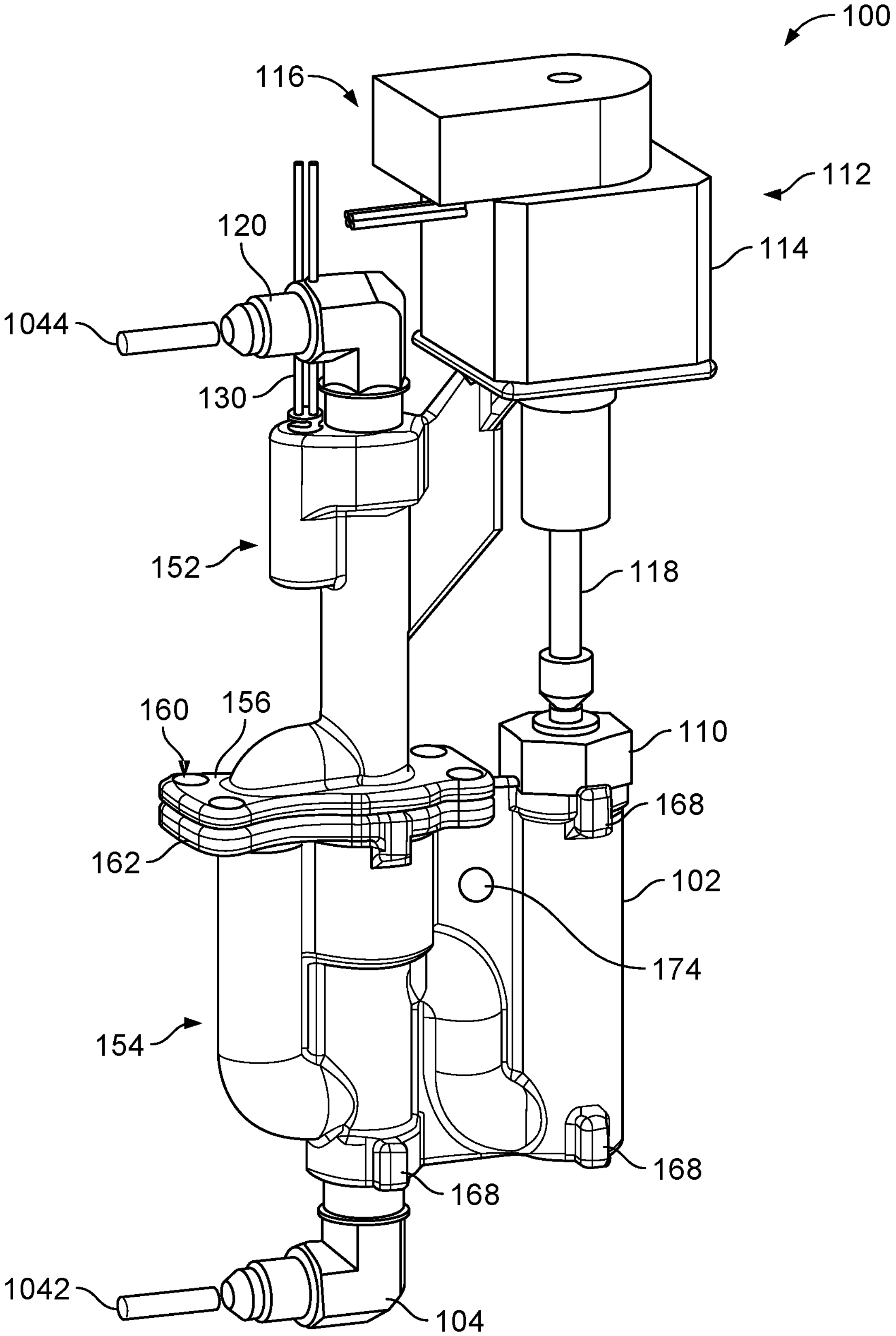
FIG. 2 is a perspective view of a metering pump of the fuel dispensing system of FIG. 1.
Figure 3:
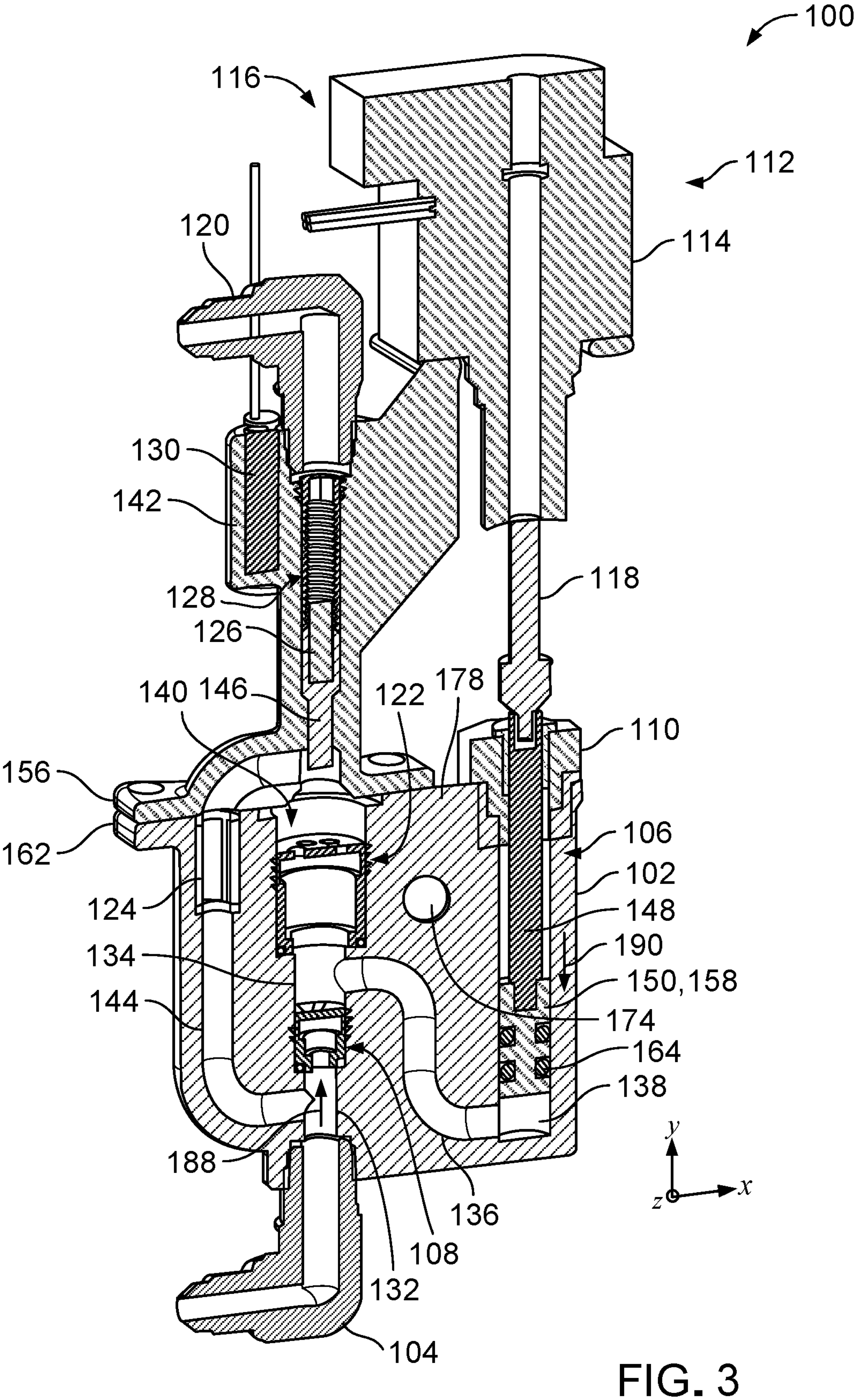
FIG. 3 is a cutaway perspective view of the metering pump of FIG. 2.

Referring to FIGS. 2 and 3, the body 102 includes upper and lower portions 152, 154 that facilitate assembly and installation of the metering pump 100. For example, the upper portion 152 defines a flange 156 that provides four through openings 160, and the lower portion 154 defines a flange 162 that provides corresponding through openings 160. The upper and lower portions 152, 154 can be aligned at the respective through openings 160 and secured to each other with fasteners 166 (shown in FIGS. 4 and 5). The lower portion 154 of the body 102 defines an opening 174 through which a fastener 176 (e.g., a bolt, shown in FIG. 7) can be passed to secure the metering pump 100 to a mounting fixture within the housing 1010 of the fuel dispensing system 1000, as will be discussed in more detail below.

Figure 6:
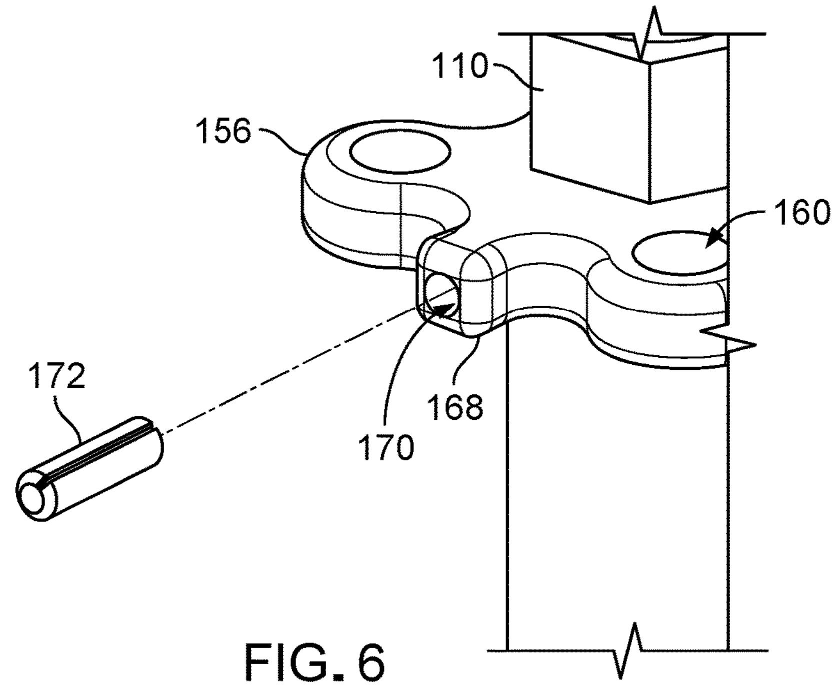
FIG. 6 is an enlarged perspective view of an installation feature of the metering pump of FIG. 2.
Figure 7:
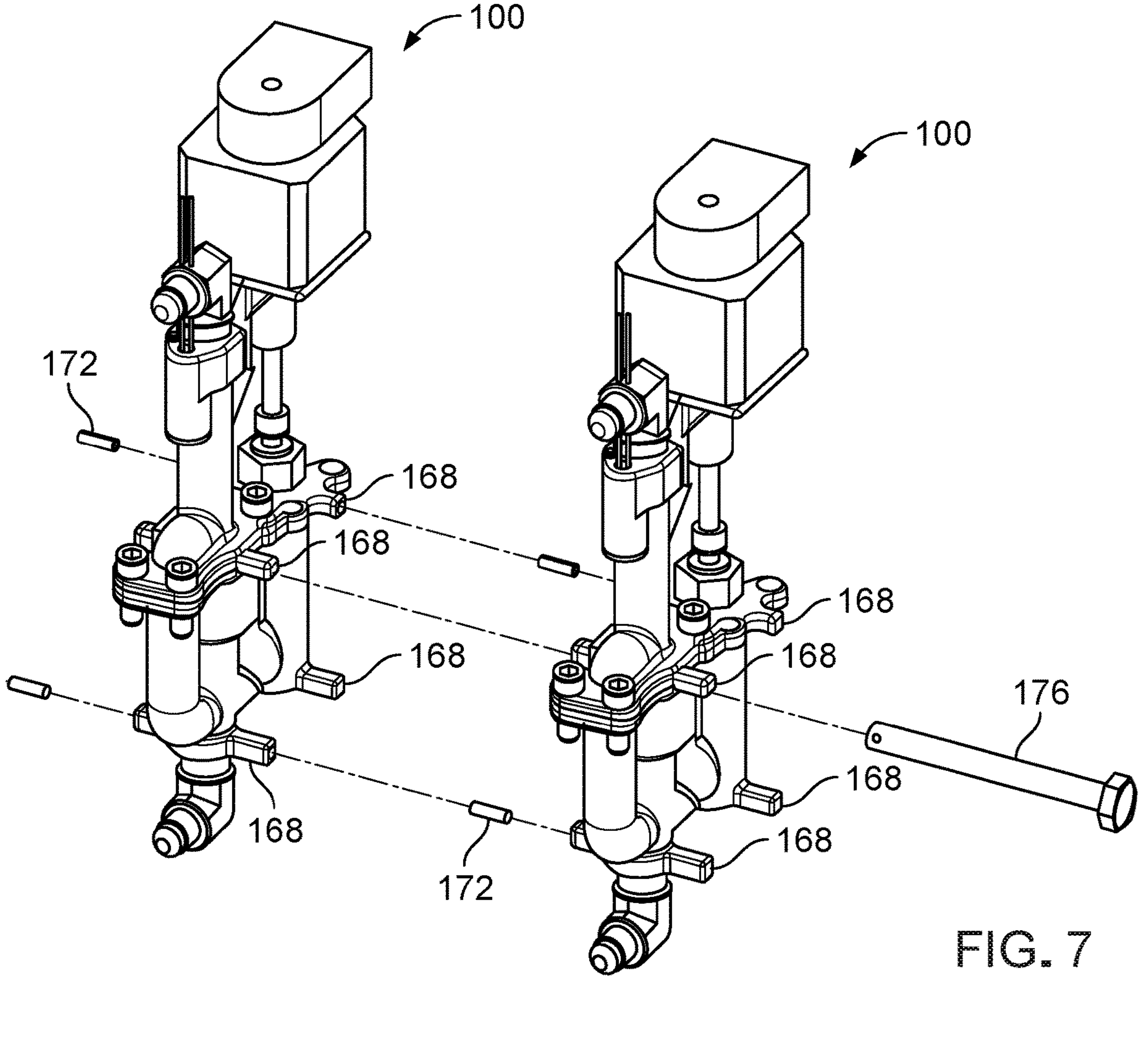
FIG. 7 is an exploded view of an assembling of two of the metering pumps of FIG. 2.
Figure 8:
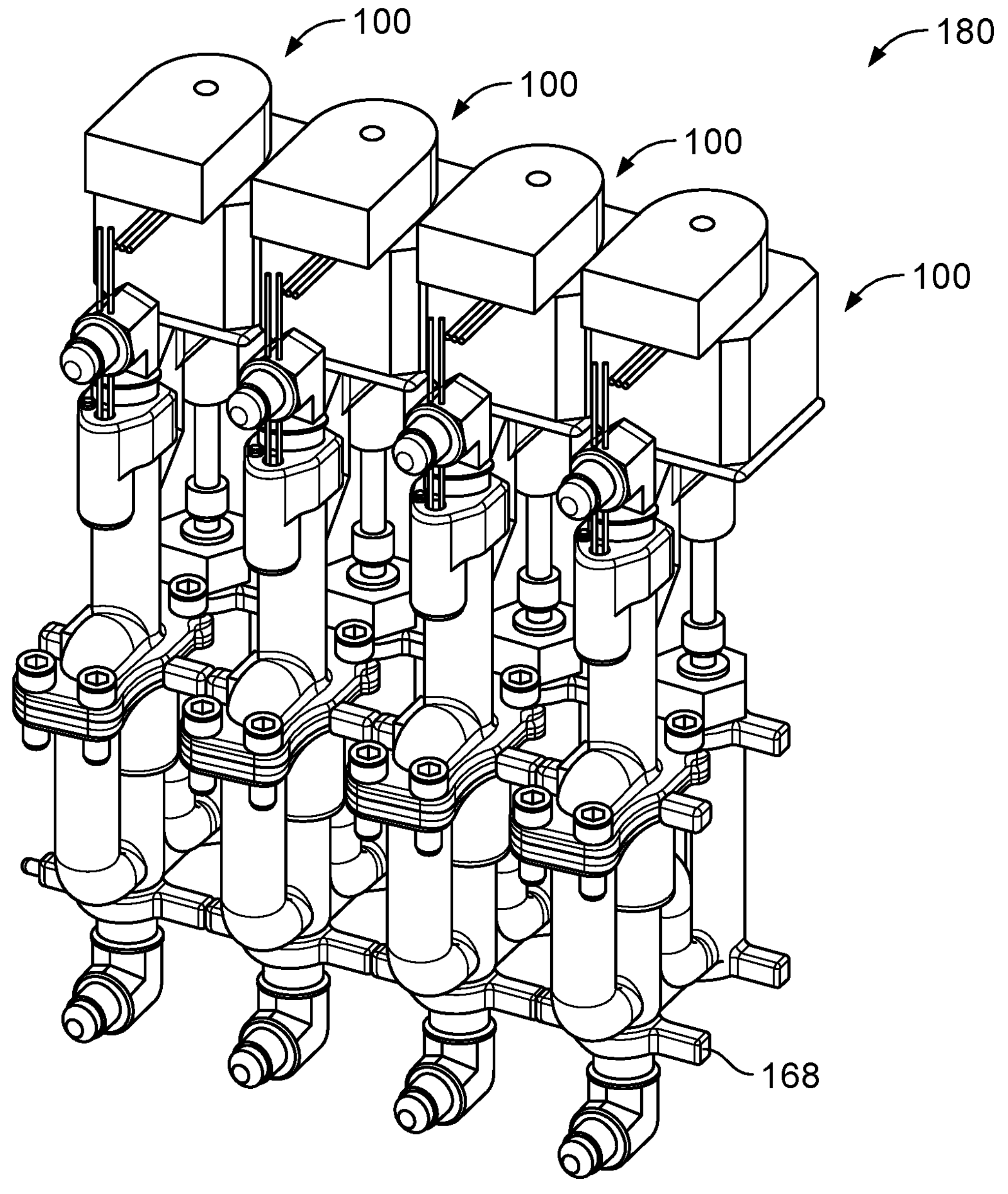
FIG. 8 is a perspective view of an assembly of multiple metering pumps of FIG. 2.

Referring to FIGS. 6-8, the body 102 defines multiple protrusions 168 providing receptacles 170 for alignment pins 172 that can be used to align multiple metering pumps 100 adjacent to one another in a laterally nested (e.g., laterally stacked) arrangement to form an assembly 180 of metering pumps 100. A single fastener 176 can be passed through the aligned openings 174 of all of the metering pumps 100 to secure the entire assembly 180 to the mounting fixture. The assembly 180 provides a compact arrangement of multiple metering pumps 100 that enables easy access to, repair, and replacement of selected one or more metering pumps 100 of the assembly 180 in case of a failure. In this aspect, the assembly 180 has a modular configuration that advantageously allows selective handling of one or more modules (e.g., one or more individual metering pumps 100) at any given time.

As discussed above, a compact configuration of the metering pump 100 advantageously facilitates installation of the metering pump 100 at a variety of locations within the fuel dispensing system 1000. Owing to the compact size, components surrounding the metering pump 100 (e.g., the column covers 1046, 1048) may be designed with a relatively low profile of improved aesthetic appeal that requires less sheet metal and facilitates painting, as compared to components designed for conventional additive pumps. The compact configuration of the metering pump 100 is achieved by both the sizes of the components of the metering pump 100 and by the arrangement of the components with respect to each other. For example, referring to FIGS. 3-5, the metering pump 100 has a narrow profile (e.g., a generally flat envelope) that allows the metering pump 100 or an assembly 180 of metering pumps 100 to fit within spaces of relatively narrow width within the fuel dispensing system 1000. A vertical arrangement of the components extending between and inclusive of the inlet 104 and the outlet 120, located forward of a vertical arrangement of the components extending between and inclusive of the actuation system 112 and the sealing element 150 of the piston 106, and located rearward of the pressure relieve valve 124, provides a substantially flat envelope that is centered along a central plane 178 of the body 102. The central plane 178 is coplanar with the xy plane shown in FIG. 3 and is accordingly oriented parallel to each of the x and y directions. That is, the inlet 104, the outlet 120, the piston 106, the piston bore 138, the inflow valve 108, and the outflow valve 122 are centered and extend along the central plane 178.

Figure 4:
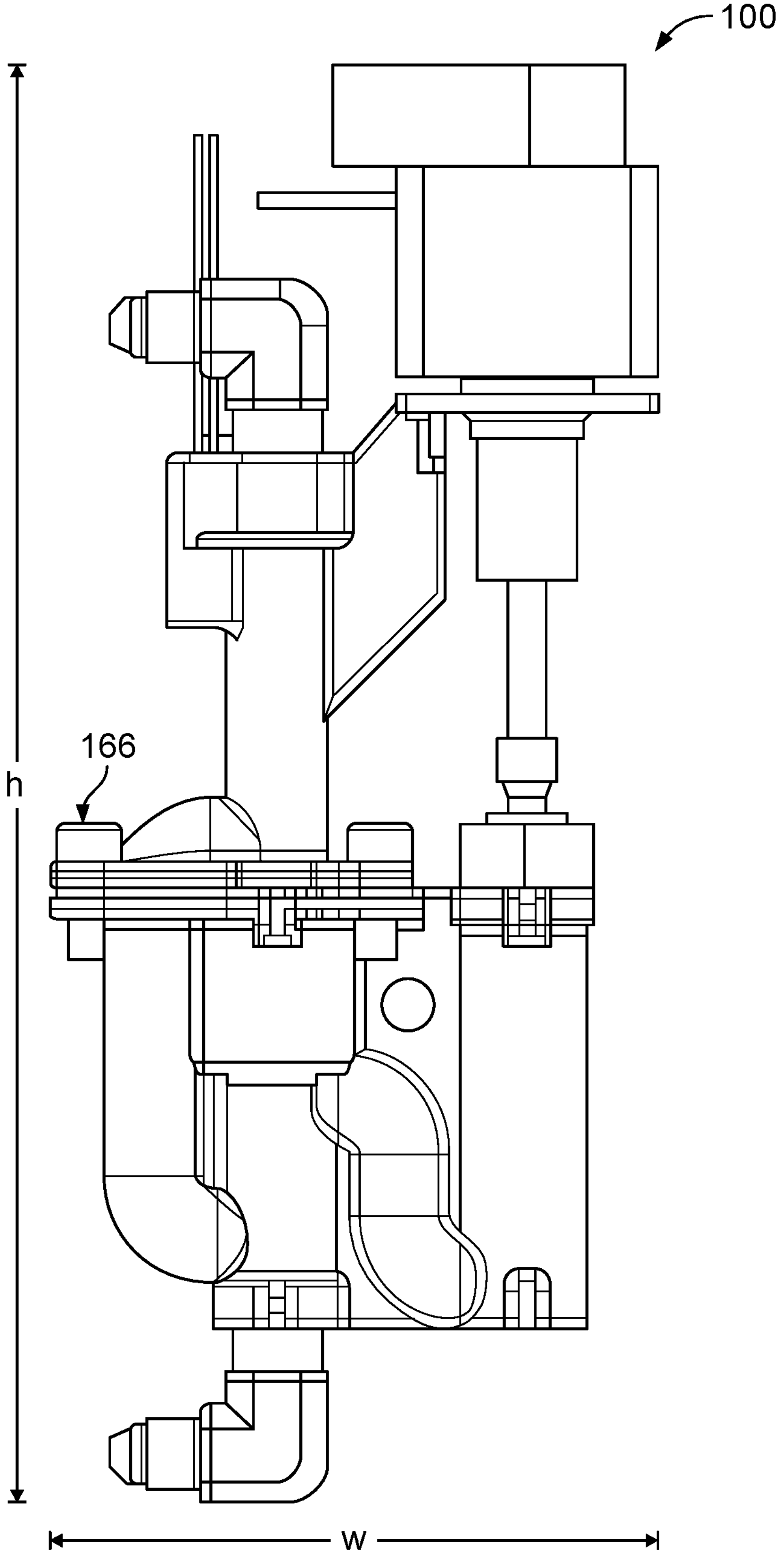
FIG. 4 is a side view of the metering pump of FIG. 2.
Figure 5:
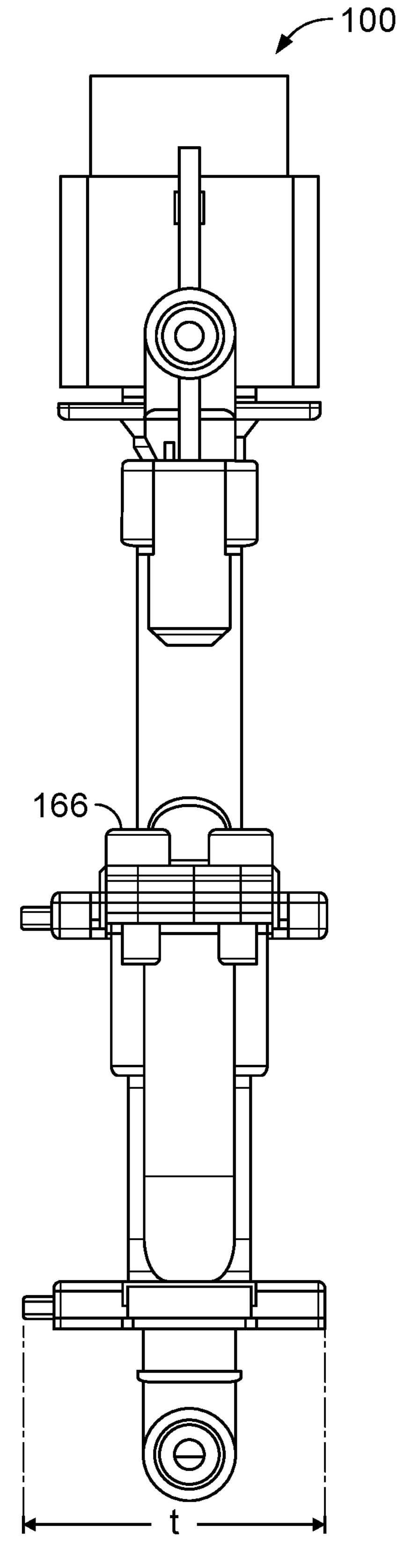
FIG. 5 is a front view of the metering pump of FIG. 2.

Referring particularly to FIGS. 4 and 5, in some embodiments, the metering pump 100 has a total width (w) that falls in a range of about 8 cm to about 9 cm, a total height (h) that falls in a range of about 22 cm to about 25 cm, and a total thickness (t) that falls in a range of about 4 cm to about 5 cm to provide a generally thin rectangular profile for which the thickness is typically less than both the height and the width. In contrast, conventional additive pumps have significantly larger dimensions, resulting in a relatively large profile with an expansive configuration that is cumbersome to assemble and install. Therefore, conventional additive pumps cannot fit within spaces of restricted size of a fuel dispensing system, such as within an inner column.

Figure 9:
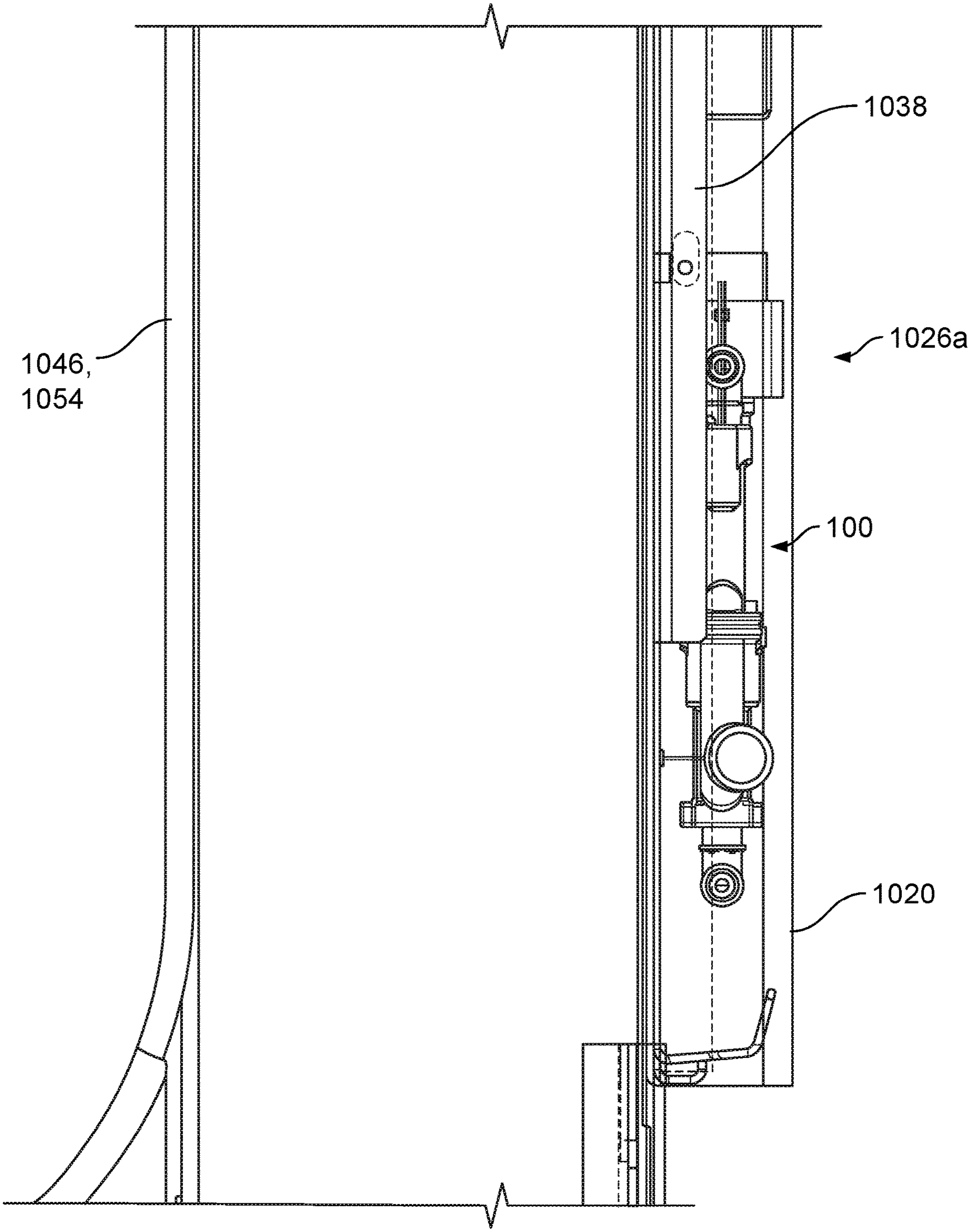
FIG. 9 is a side perspective view of the metering pump of FIG. 2 installed to an inner column area within the fuel dispensing system of FIG. 1.
Figure 10:
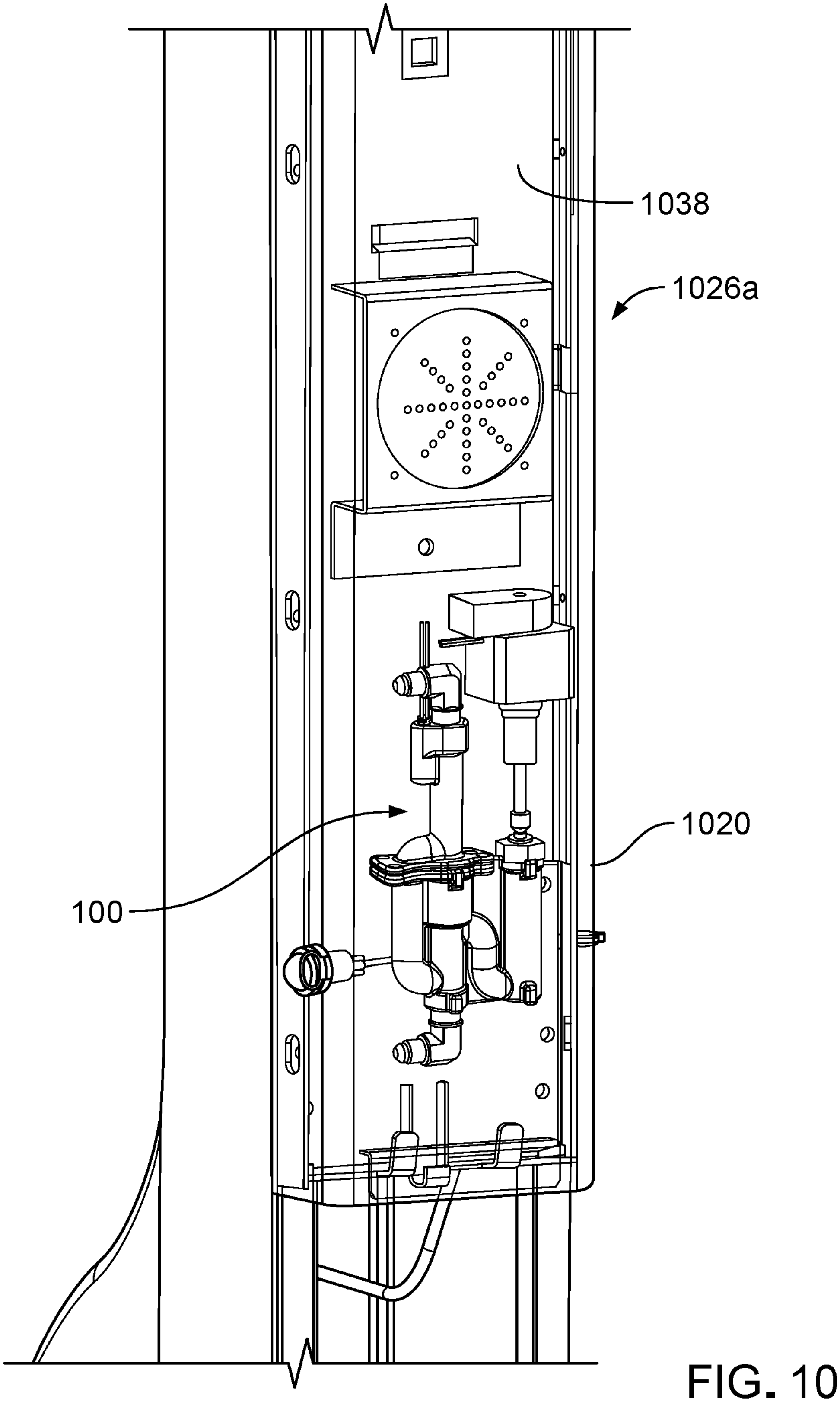
FIG. 10 is a rear perspective view of the installation of FIG. 9.
Figure 11:
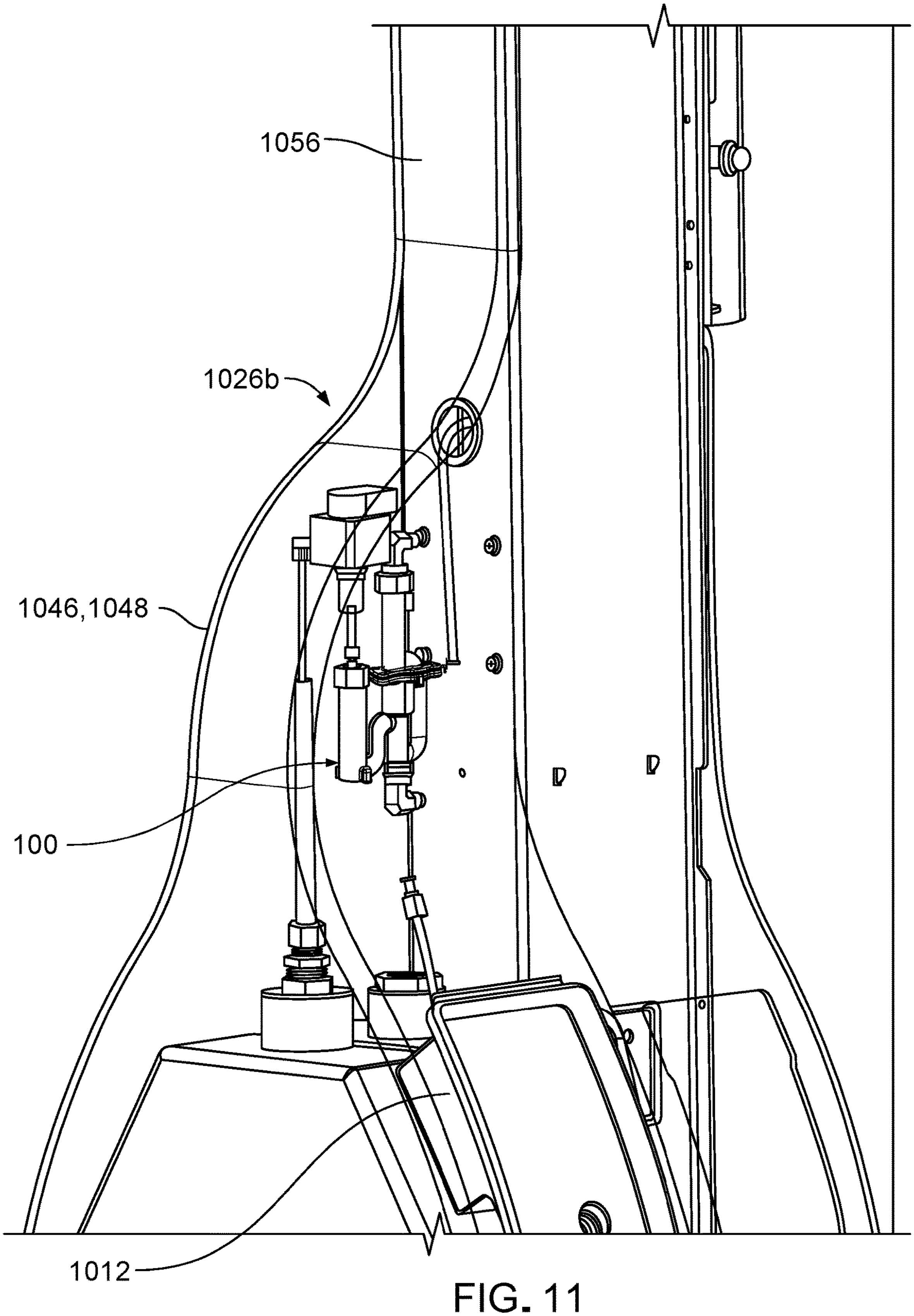
FIG. 11 is a perspective view of the metering pump of FIG. 2 installed to an outer column area within the fuel dispensing system of FIG. 1.

Referring to FIGS. 9 and 10, in some embodiments, one or more metering pumps 100 may be installed to a mounting fixture (e.g., a column stiffener 1038 within the inner column cover 1020) at the location 1026*a* within the inner column cover 1020. Referring to FIG. 11, in some embodiments, one or more metering pumps 100 may be installed to a mounting fixture (e.g., a column support member 1056) at a location 1026*b* extending into the base 1048 of the outer column cover 1046. In other embodiments, one or more metering pumps 100 may be installed within the upper frame 1022 of the fuel dispensing system 1000.

The body 102 of the metering pump 100 is typically made of one or more metals, such as aluminum, iron, steel, and zinc that may be relatively light-weight, strong, and corrosion-resistant, that have chemical compatibility, and that are compliant with regulatory requirements. In some embodiments, the body 102 is manufactured via a low volume investment casting process during which the various internal fluid pathways (e.g., the inflow channel 132, the channel hub 134, the actuation channel 136, the piston bore 138, the receptacle 142, the outflow channel 140, and the bypass channel 144) are formed directly in the body 102 in the same step of the investment casting process. That is, the internal fluid pathways are defined by and integral with the body 102, as discussed above with respect to FIG. 3. Investment casting of the internal fluid pathways of the body 102 advantageously eliminates the need for separate components (e.g., tubing and fittings) that would otherwise be assembled to form the pathways. Accordingly, investment casting of the pathways reduces assembly time of the metering pump 100 and avoids potential leaks that could otherwise develop at such components. In some examples, first and second halves of the body 102 (e.g., along opposite sides of the central plane 178) may be formed during a same first step via investment casting and subsequently assembled in a second step of a manufacturing process (e.g., by welding or another technique). Overall, the material selection, manufacturing technique, and compact size of the metering pump 100 provides a relatively low cost metering option as compared to conventional additive pumps.

Furthermore, the metering pump 100 is designed to accommodate a variety of additive concentrations that may fall within a wide range of about 100 parts per million (ppm) to about 1500 ppm. For example, each metering pump 100 may be designed with a piston bore 138 of a selected diameter that is chosen to provide a particular dispense volume of additive for accommodating additive concentrations within a certain range. Additionally, an axial stroke length of the piston 106 within the piston bore 138 may be set at a desired length at the control module 1008 to provide a particular dispense volume of additive for accommodating additive concentrations within a certain range. Therefore, a combination of a selected diameter of the piston bore 138 and a settable axial stroke length of the piston 106 together allow a given metering pump 100 to be tuned to additive concentrations within a desired range.

Figure 12:
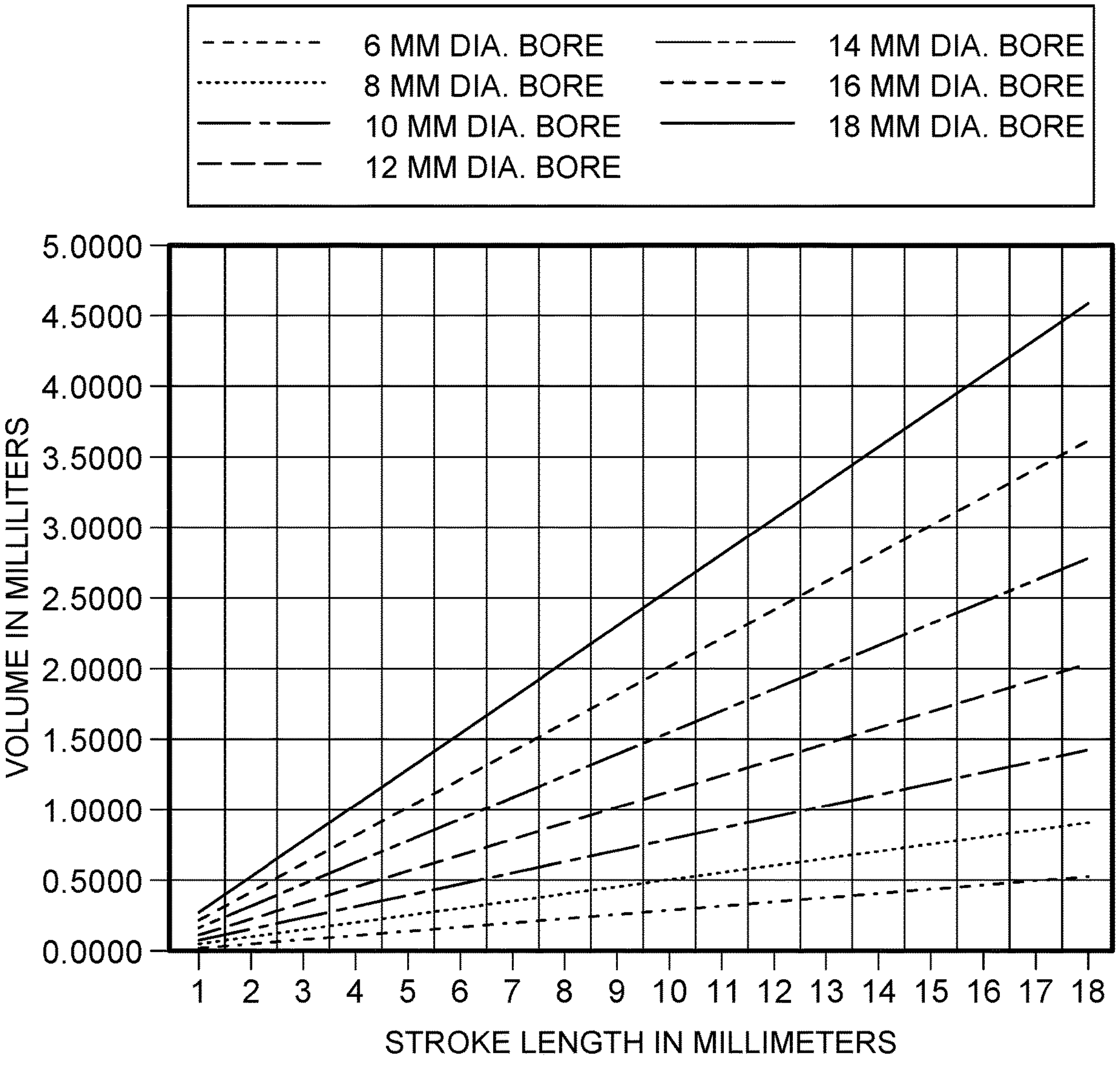
FIG. 12 is a graph that illustrates relationships among a dispense volume of an additive, a piston stroke length, and a piston bore diameter of the metering pump of FIG. 2.

FIG. 12 presents an example graph 186 that illustrates example relationships among dispense volume, stroke length, and bore diameter of metering pumps 100. In some embodiments, a diameter of the piston bore 138 falls within a range of about 6 millimeters (mm) to about 18 mm, with a diameter of the contained piston 106 being slightly smaller to be slidable within and sealable against the piston bore 138. In some examples, the axial stroke length of the piston 106 may be set at a distance that falls in a range of about 1 mm and about 18 mm. Accordingly, a dispense volume of an additive within a metering pump 100 typically falls within a range of about 0.3 milliliters (mL) to about 5 mL.

An assembly 180 therefore may include metering pumps 100 that differ in diameters of piston bores 138 and in axial stroke lengths of the pistons 106 to accommodate multiple options of additives that may be selected at a user interface module 1004 of the fuel dispensing system 1000. For example, the calibratable design of the metering pump 100 can provide additive options for both gasoline and diesel fuel at the same fuel dispensing system 1000. The calibratable design of the metering pump 100 also allows the metering pump 100 to be utilized across a wide range of fueling applications globally.

At a point of sale of an additive at the fuel dispensing system 1000, the control module 1008 activates the appropriate metering pump 100 and controls the metering pump 100 to inject an appropriate amount of the additive into the internal portion of a dispensing line 1024, 1052 as a selected fuel is dispensed from the respective pump nozzle 1006, 1040. In some examples, an additive may be selected at the user interface module 1004 as an extra sale of a predetermined volume with respect to a fuel sale. In such cases, the predetermined volume of additive is injected into the internal portion of the dispensing line 1024, 1052 in an upfront dose delivered by one or more piston strokes at a start of the sale. Such a method of injecting the additive may be referred to as a dosing method. In other examples, an additive may be selected as a prescribed volume of additive that is automatically injected into a prescribed volume of a selected fuel that is dispensed in association with a single transaction. In such cases, the prescribed volume of additive is injected into the internal portion of the dispensing line 1024, 1052 upon dispensing of each prescribed volume (e.g., 1 liter (L) or 0.5 L) of the selected fuel that is dispensed. Such a method of injecting the additive may be referred to as a proportional method.

In either case, the control module 1008 causes the piston 106 of the metering pump 100 to retract (e.g., move in the direction 188) to extract the necessary volume of additive from the corresponding storage tank 1012. The additive is drawn through the inflow valve 108 into the piston bore 138. At the end of a successful piston stroke, the piston 106 moves downward in the reverse direction 190 to push the volume of additive through the outflow valve 122 and the outlet 120 for injection into the selected fuel, while the additive is prevented from flowing back through the inflow valve 108. Flow of the additive through the outflow valve 122 causes a pulse (e.g., an upward movement) of the magnet 126. The flow sensor 130 registers the pulse and transmits a signal indicating an occurrence of the pulse to the control module 1008 for accurate monitoring of the flow of dispensed additive. In the event that the outlet 120 is closed (e.g., due to a failure at the control module 1008) or otherwise blocked, the additive will flow through the bypass channel 144 from the outflow channel 140 back down to the inflow channel 132 to provide a bypass loop for returning the additive to the storage tank 1012.

While the metering pump 100, the assembly 180, and the fuel dispensing system 1000 have been described and illustrated with respect to certain dimensions, sizes, shapes, arrangements, materials, and methods, in some embodiments, a metering pump, an assembly, or a fuel dispensing system that is otherwise substantially similar in construction and function respectively to the metering pump 100, the assembly 180, or the fuel dispensing system 1000 may include one or more different dimensions, sizes, shapes, arrangements, and materials or may be utilized according to different methods. For example, while the various fluid pathways of the metering pump 100 have been described and illustrated as void spaces that are integrally formed within the body 102 of the metering pump 100, in some embodiments, a metering pump that is otherwise substantially similar in construction and function to the metering pump 100 may alternatively include one or more fluid pathways that are embedded into the body 102 as separate components (e.g., separate tubular components). Other embodiments are also within the scope of the following claims.

What is claimed is:

1. A metering pump for dispensing a fuel additive, the metering pump comprising:

a pump body;

an inlet at which the fuel additive enters the metering pump and an outlet at which the fuel additive exits the metering pump, the inlet and the outlet being coupled to the pump body, the inlet and the outlet aligned in an axial arrangement;

a piston bore defined by and within the pump body, this piston bore oriented parallel to the axial arrangement;

a piston contained within the piston bore, the piston being configured to draw the fuel additive into the metering pump through the inlet and to dispense the fuel additive from the metering pump through the outlet;

an inflow valve coupled to the pump body and configured to permit the fuel additive to flow in a single direction away from the inlet and to prevent the fuel additive from flowing in an opposite direction back into the inlet; and an outflow valve coupled to the pump body and configured to permit the fuel additive to flow in the single direction towards the outlet, wherein the metering pump comprises a configuration in which the inlet, the outlet, the piston, the piston bore, the inflow valve, and the outflow valve are centrally positioned along a central plane of the pump body.

2. The metering pump of claim 1, wherein the configuration provides the metering pump with a substantially flat shape.

3. The metering pump of claim 1, further comprising an actuation system coupled to the pump body and to the piston, the actuation system being configured to move the piston in a first direction to draw the fuel additive into the piston bore and to move the piston in a second direction to eject the fuel additive from the piston bore, the second direction being opposite to the first direction.

4. The metering pump of claim 1, wherein the inflow valve and the outflow valve are axially aligned with the inlet and the outlet along the axial arrangement.

5. The metering pump of claim 4, wherein the piston bore is disposed along a first side of the pump body, and wherein the metering pump further comprises a pressure relief system disposed along a second side of the pump body, the second side being opposite from the first side, and the pressure relief system being centrally positioned along the central plane of the pump body.

6. The metering pump of claim 5, wherein the pressure relief system comprises a pressure relief valve and a bypass channel defined by the pump body, wherein the bypass channel comprises a main portion that contains the pressure relief valve, and wherein the pressure relief valve and the main portion are oriented parallel to the axial arrangement.

7. The metering pump of claim 6, wherein a first end of the bypass channel is located downstream of the outflow valve and a second end of the bypass channel is located upstream of the inflow valve, wherein the pressure relief valve is configured to permit through-flow of the fuel additive along the bypass channel and back to the inlet once a fluid pressure of the fuel additive reaches a threshold pressure.

8. The metering pump of claim 6, wherein the pump body defines an inflow channel that extends from the inlet through a position of the inflow valve, a channel hub that extends between the inflow and outflow valves, and an outflow channel that extends from the channel hub to the outlet and that therefore contains the outflow valve, and wherein the inflow channel, the channel hub, and the outflow channel are axially aligned with the axial arrangement.

9. The metering pump of claim 8, wherein the pump body defines an actuation channel that extends from the channel hub towards the piston bore, and wherein the actuation channel, the inflow channel, the channel hub, the outflow channel and the bypass channel are centrally positioned along the central plane of the pump body.

10. The metering pump of claim 9, wherein the actuation channel, the inflow channel, the channel hub, the outflow channel, the bypass channel, and the piston bore are integrally formed with the pump body.

11. The metering pump of claim 4, further comprising:

a magnetically activated flow sensor that is configured to detect a flow of a volume of the fuel additive towards the outlet; and a magnet disposed within an outflow channel of the body and configured to be moved axially by the flow of the volume of the fuel additive, wherein the magnet is axially aligned with the inlet and the outlet along the axial arrangement.

12. The metering pump of claim 1, wherein the pump body defines one or more lateral protrusions at which the metering pump is alignable laterally with another metering pump.

13. The metering pump of claim 1, wherein the pump body defines an opening sized to receive a fastener for securing the metering pump to a mounting fixture.

14. The metering pump of claim 1, wherein the metering pump has a total thickness that falls in a range of about 4 cm to about 5 cm.

15. A fuel dispensing system, comprising:

a fuel line configured for carrying a fuel to be dispensed from the fuel dispensing system;

a storage tank containing a fuel additive to be injected into the fuel;

an assembly of multiple metering pumps coupled to the storage tank and configured to inject the fuel additive into the fuel, the assembly of multiple metering pumps arranged in a laterally stacked configuration, each of the metering pumps of the assembly of multiple metering pumps comprising:

a pump body, an inlet at which the fuel additive enters the respective metering pump and an outlet at which the fuel additive exits the respective metering pump, the inlet and the outlet being coupled to the pump body, a piston bore within the pump body, a piston contained within the piston bore, the piston being configured to draw the fuel additive into the respective metering pump through the inlet and to dispense the fuel additive from the respective metering pump through the outlet, an inflow valve coupled to the pump body and configured to permit the fuel additive to flow in a single direction away from the inlet and to prevent the fuel additive from flowing in an opposite direction back into the inlet, and an outflow valve coupled to the pump body and configured to permit the fuel additive to flow in the single direction towards the outlet, wherein the metering pump comprises a configuration in which the inlet, the outlet, the piston, the piston bore, the inflow valve, and the outflow valve are centrally positioned along a central plane of the pump body; and a control module configured to control operation of the assembly of multiple metering pumps.

16. The fuel dispensing system of claim 15, further comprising a housing that supports or contains each of the fuel line, the storage tank, the metering pump, and the control module.

17. The fuel dispensing system of claim 16, wherein the metering pump is installed to a columnar member of the housing.

18. The fuel dispensing system of claim 15, wherein the control module is configured to control an axial stroke length of the piston.

* * * * *